Aug. 26, 1941.                R. S. CLAYTON                2,253,893
COMBINATION PRESSURE AND ABSORPTION TYPE REFRIGERATION DEVICE
Filed Feb. 2, 1940                           3 Sheets-Sheet 1
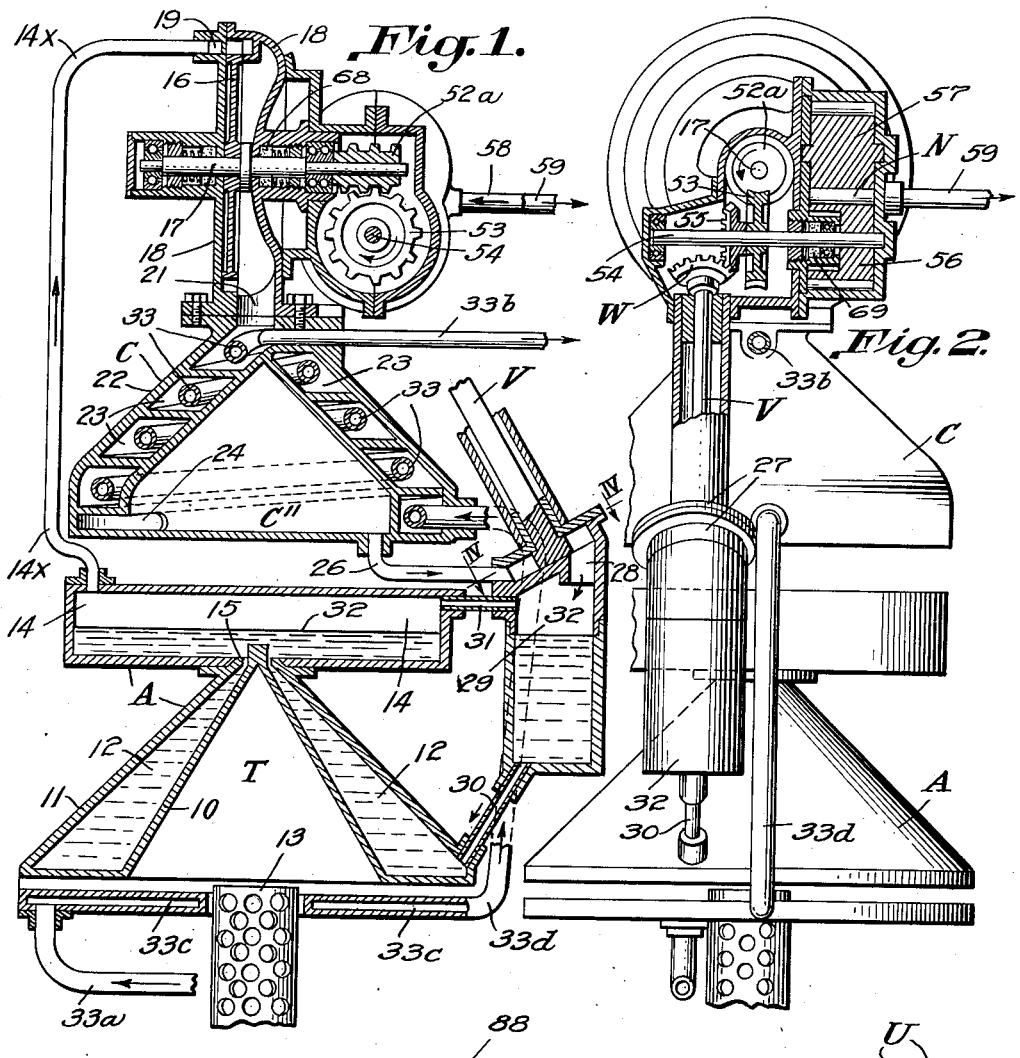
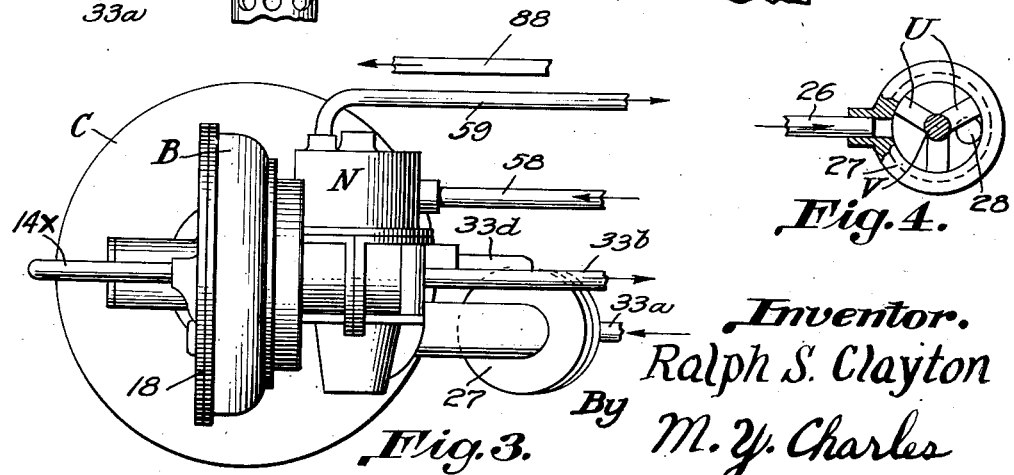
Inventor.
Ralph S. Clayton
By M. Y. Charles
Attorney.

Aug. 26, 1941.  R. S. CLAYTON  2,253,893
COMBINATION PRESSURE AND ABSORPTION TYPE REFRIGERATION DEVICE
Filed Feb. 2, 1940  3 Sheets-Sheet 2

Inventor.
Ralph S. Clayton
By M. Y. Charles
Attorney.

Aug. 26, 1941.   R. S. CLAYTON   2,253,893
COMBINATION PRESSURE AND ABSORPTION TYPE REFRIGERATION DEVICE
Filed Feb. 2, 1940   3 Sheets-Sheet 3
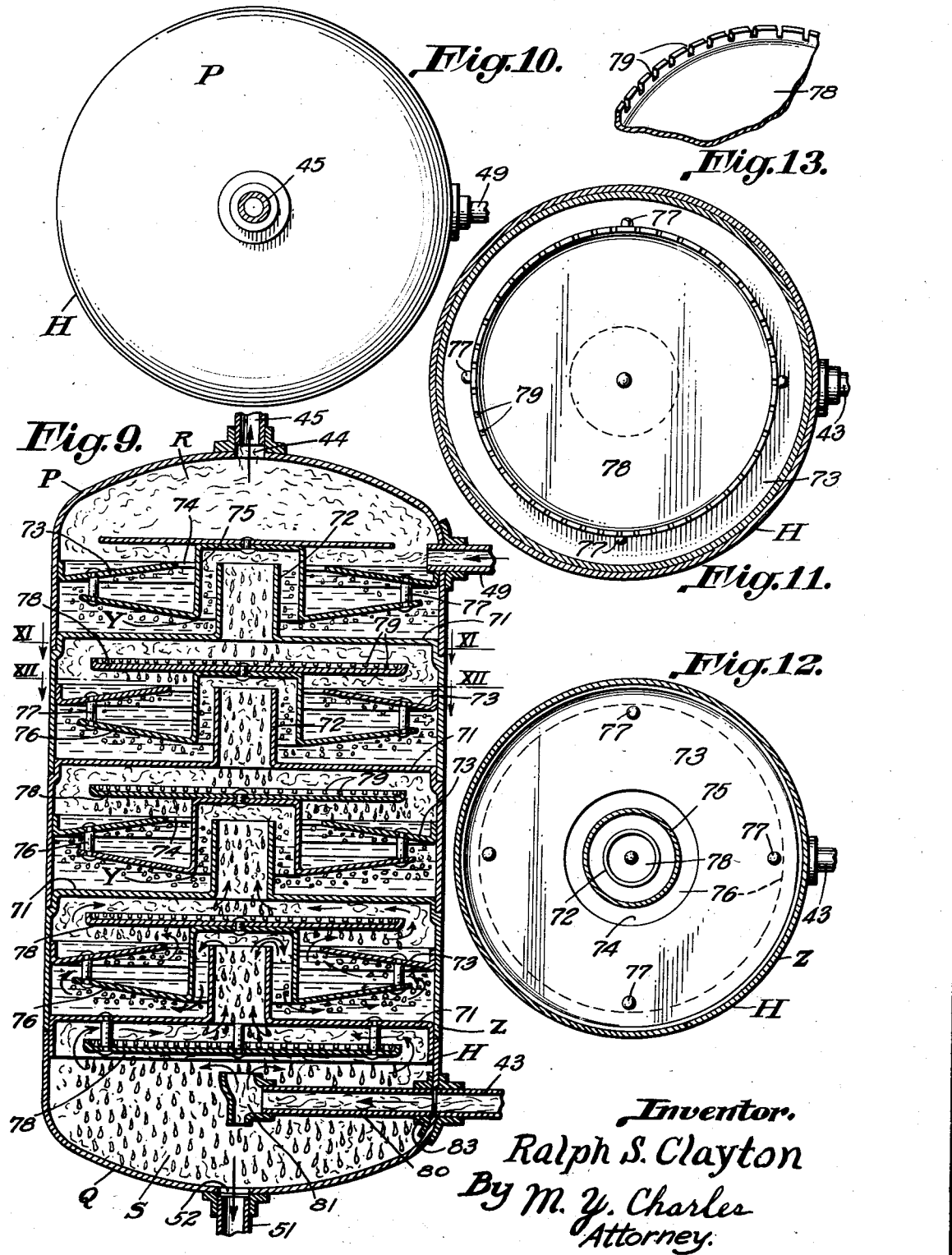
Inventor.
Ralph S. Clayton
By M. Y. Charles
Attorney.

Patented Aug. 26, 1941

2,253,893

UNITED STATES PATENT OFFICE 2,253,893

COMBINATION PRESSURE AND ABSORPTION TYPE REFRIGERATION DEVICE

Ralph S. Clayton, Wichita, Kans.

Application February 2, 1940, Serial No. 317,013

10 Claims. (Cl. 62—5)

This invention relates to a combination pressure and absorption type of refrigeration system.

The device referred to in this specification and shown in the drawings is designed to carry on the process of producing refrigeration as shown and described in my co-pending application for a patent on a Combination pressure and forced absorption process of producing refrigeration, filed Feb. 2, 1940, Ser. No. 317,012.

This system has for its basic idea the fact that if a given amount of fuel is burned in any sort of an engine to produce motion, then there is a considerable loss in efficiency and this loss is dissipated for the most part in the shape of heat. On the other hand, if a given amount of fuel is burned to produce vaporization—such as for instance in an absorption refrigeration system—then the motion it would have produced is lost, in as much as the heat would have still been available for the most part in the exhaust of the engine after its use to produce power. With this idea in mind a straight compression type of refrigeration system operated by a small mercury motor has been devised and by utilizing the condensing mercury gas to heat the absorbent and the addition of an analyzer, an absorption chamber and a pair of circulation pumps it also operates as an absorption system, both systems using the same condenser, the same expansion valve and the same chilling coil.

A further object of my invention is to provide a device for developing refrigeration in which a refrigerant gas and an absorbent for the refrigerant gas is employed, and the boiling points of the refrigerant gas and the absorbent liquid are so far apart that enough heat may be applied to the refrigerant ladened liquid absorbent that the refrigerant will readily and quickly vaporize and separate from the absorbent liquid without approaching the boiling point of the absorbent liquid. The two chemicals selected to be used in this device are trimethylamine, which boils at +3½ degrees centigrade, as the refrigerant; and benzyl alcohol, which boils at +204 degrees centigrade, as the absorbent.

In view of the fact that trimethylamine, when transformed from a gas to a liquid, gives off a large amount of latent heat, this also makes it possible to decrease the size of the machine. In view of the large amount of latent heat given off by the trimethylamine, it is a further object of this invention to provide a refrigerating system in which the latent heat given off by the refrigerant gas is used to partially heat the refrigerant ladened absorbent (strong liquor), in the system so that only a small amount of heat is necessary to be added to the strong liquor to perpetuate the cycle or refrigeration.

A still further object of the invention is to provide a refrigerating device that is extremely small and simple. This is made possible in view of the fact that one cubic centimeter of benzyl alcohol will absorb 1198 cubic centimeters of trimethylamine at 25 degrees centigrade, which is by far a greater proportional amount of refrigerant absorbed into an absorbent than has been heretofore used in either an absorption or pressure refrigeration system, and because of the characteristic of a small amount of benzyl alcohol absorbing such a large amount of the trimethylamine, a very much increased amount of refrigeration is realized over that of other chemicals now in use that the size of the refrigerating device may be very much decreased in size and still deliver as much refrigeration as other larger machines.

It is also a further characteristic of benzyl alcohol and trimethylamine that they will perform to produce refrigeration under pressures as low as twenty-five pounds, therefore the refrigeration device may be built of much lighter weight materials than other machines having the same capacity of refrigeration as my machine. Due to the low pressure employed in my machine, it is obvious that little or no trouble will be experienced from leakage of either the refrigerant or the absorbent through or from the various parts of the machine.

These and other objects of my invention will be more fully explained as this description progresses.

Now referring to the accompanying drawings:

Fig. 1 is a vertical sectional detail view through the mercury boiler, turbine, combination mercury condenser and strong liquor boiler for the refrigerating device.

Fig. 2 is a side view of the device shown in Fig. 1, parts being broken away for convenience of illustration.

Fig. 3 is a plan view of the device shown in Fig. 1.

Fig. 4 is a sectional view through the mercury injector, the view being taken along the line IV—IV in Fig. 1, and looking in the direction of the arrows.

Figure 7:
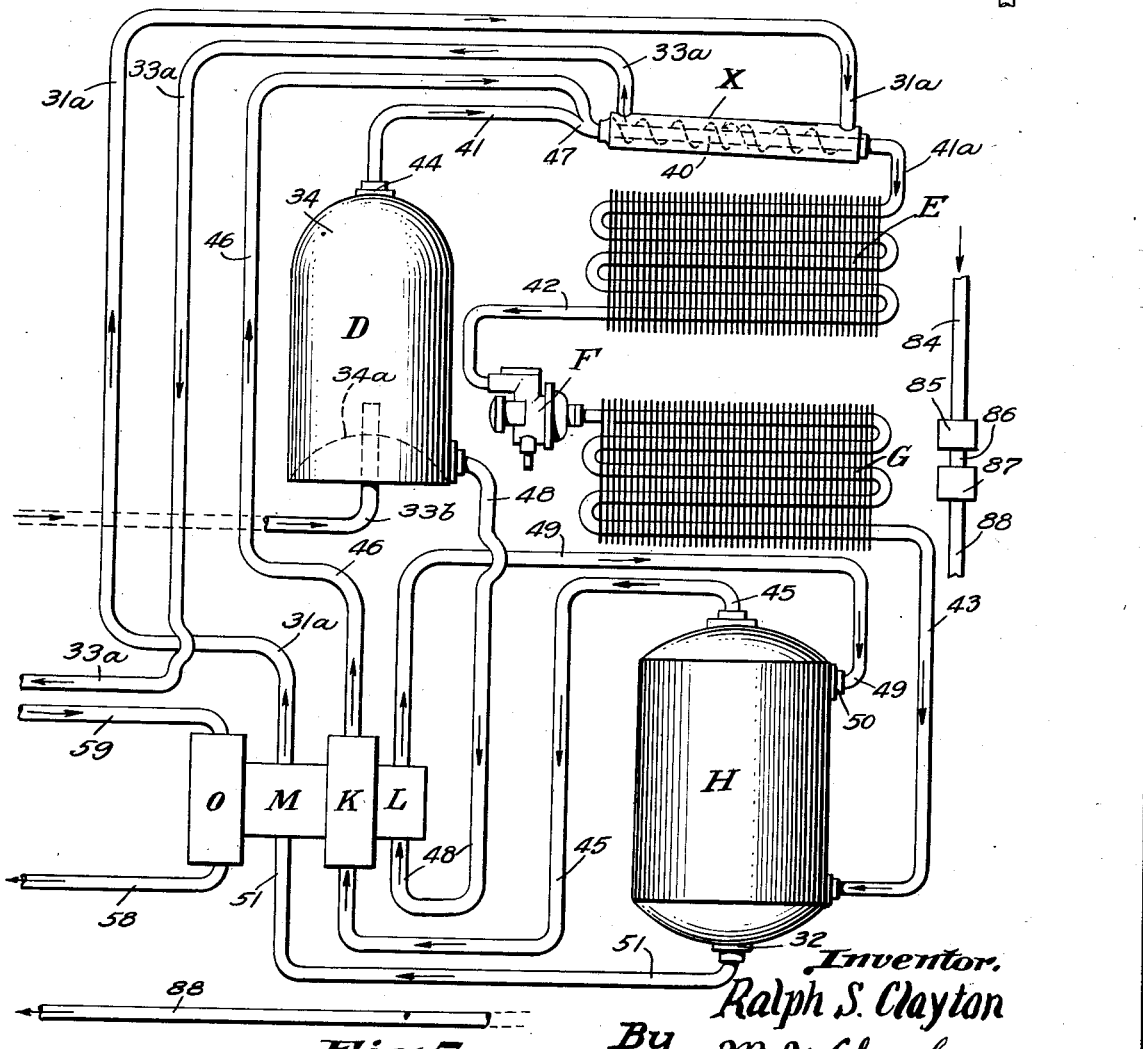

Fig. 7, combined with Fig. 1, is a diagrammatical layout of the refrigerating system.

Figure 8:
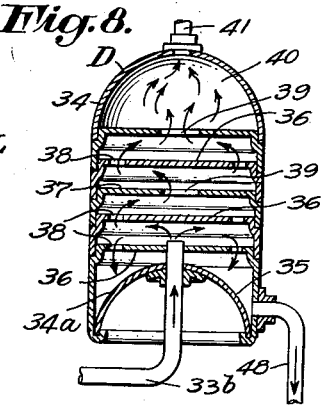

Fig. 8 is a vertical sectional view through the analyzer, which is a part of the refrigerating system.

Fig. 9 is a vertical sectional vew through the absorption tank, which is a part of the refrigerating system.

Fig. 10 is a plan view of the absorption tank shown in Fig. 9.

Fig. 11 is a cross sectional view of the absorption tank, the view being taken along the line XI—XI in Fig. 9.

Fig. 12 is a cross sectional view of the absorption tank, the view being taken along the line XII—XII in Fig. 9.

Fig. 13 is a perspective view of a portion of one of the drip plates employed in the absorption chamber.

Similar numerals of reference designate the same parts throughout the several figures of the drawings.

In the accompanying drawings is shown my improved refrigerator device, in which is shown a mercury boiler A which comprises a hollow conical shaped element 10 positioned inside of a second conical shaped element 11, there being a space 12 between the two cones 10 and 11 to receive mercury that is to be heated. At 13 is shown the tip of a gas burner that will put a flame inside the cone 10 so as to heat the mercury in the space 12.

At 14 is a boiler portion having an opening 15 therein to receive heated mercury from the space 12, the mercury spreading over the floor of the boiler portion 14 so as to have an area from which vapor may rise and raise a pressure in the boiler portion 14.

At B is a turbine type motor which comprises a finned turbine wheel 16 that is carried on a shaft 17, the turbine wheel being revolvable in a case 18 which contains a port 19 through which is fed the mercury vapor, under pressure, from the boiler portion 14 through the pipe 14x to the port 19 and through the turbine wheel 16. At 21 is an exhaust passage which receives the exhaust of the turbine B and discharges it into the condenser C which comprises a conical shaped element 22 that is provided with a helical passage 23 that drains through an opening 24 into the cavity C' from which a pipe 26 leads to an injector 27 that has a discharge opening 28 that opens into a mercury receiving chamber 29 that drains through a pipe 30 back into the space 12 in the boiler A. At 31 is a small pipe connecting between the portion 14 of the boiler A and the top portion of the mercury receiving chamber 29 so that there will be equal vapor pressure in both chambers 14 and 29 and the mercury level 32 will always be the same in both chambers 14 and 29 or 12 and 29 and the condensed mercury will always flow from the injector 27 into the chamber 29.

In the helical passage 23 of the condenser C is a generator coil of pipe 33, the upper end of which extends as pipe 33b to and discharges into an analyzer device D that comprises a closed housing 34 that has an upwardly curved bottom 34a that forms a V-shape 35 at the bottom of the analyzer to facilitate complete drainage therefrom as will later be described.

In the analyzer D is a series of horizontally disposed plates 36 and 37. The plates 36 having holes 38 in the outer edge portion thereof, and the plates 37 having a hole 39 at the center thereof so as to form a zig-zag passage or line of travel through the analyzer to the upper chamber 40 thereof.

At 41 is a pipe leading from the analyzer chamber 40 to and through a counterflow heat exchanger X and continues as pipe 41a to the upper end of the condenser E. At 42 is a pipe that leads from the lower end of the condenser E to, and discharges into an expansion valve F which in turn discharges into the upper end of the chilling coil G. At 43 is a pipe leading from the lower end of the chilling coil G to and entering the lower side portion of the absorption tank H.

At the point 44 the pipe 45 enters the top of the absorption tank H and leads to the intake connection of a rotary compressor K. At 46 is a pipe, one end of which connects to the discharge end of the compressor K and the other end connects into the pipe 41 at the point 47 just ahead of the heat exchanger X.

At 48 is a pipe, one end of which connects into the bottom of the analyzer D and the other end connects with the intake of a small gear pump L. At 49 is a pipe, one end of which connects to the discharge side of the small gear pump L and leads to and enters the upper side portion of the absorption tank H at the point 50.

At 51 is a pipe, one end of which connects into the bottom portion of the absorption chamber H at the point 52 so as to drain the contents of the lower portion of the absorption tank H. The other end of the pipe 51 connects with the intake of a second gear pump M, which is somewhat larger than the pump L.

At 31a is a pipe, one end of which connects with the discharge side of the pump M and the other end of the pipe 31a connects to the outer lower end portion of the counterflow heat exchanger X. At 33a is a pipe, one end of which connects to the upper outside portion of the counterflow heat exchanger X and the other end connects with a reflected heat absorber 33c. At 33d is a pipe connecting between the reflected heat absorber 33c and the generator coil of pipe 33 in the helical condenser channel 23 in the housing C.

In Figures 1 and 2 is shown a pump device that is driven by the turbine shaft 17. On the shaft 17 is shown a worm 52a on which is in mesh with a worm wheel 53 that is rigidly mounted on a shaft 54 on which is rigidly mounted a bevel gear wheel 55 and one gear 56 of a gear pump N which in turn drives the second gear 57 of the gear pump N. At 58 is shown a pipe leading to the intake of the pump N, and at 59 is a pipe carrying the discharge from the pump N.

Figure 5:
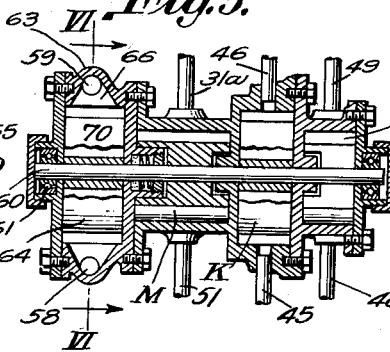
Fig. 5 is a longitudinal sectional view through the pumps, compressor, and motor for the drive of the pumps and compressor.

In Figure 5 is shown a cross sectional view of two pumps L and M, a compressor K, and a hydraulic motor O for driving the pumps L and M, and the compressor K. In this assembly is shown a shaft 60 carried in bearings 61 and 62 at either end of the shaft 60 and in the housing elements of the motor O and pump L.

Figure 6:
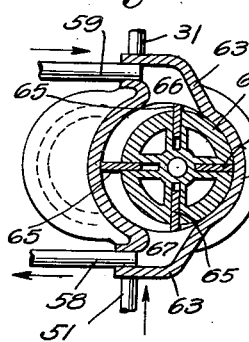
Fig. 6 is a sectional view through the driving motor for the pumps and compressor, the view being taken along the line VI—VI in Fig. 5.

In Figures 5 and 6 is shown sectional view of the hydraulic motor O in which is shown a housing 63 in which is housed a rotor 64 that is rigidly mounted on the shaft 60. The rotor 64 is provided with a plurality of plates 65 slidably mounted in the rotor 64 and adapted to fit against the walls of the housing in which they revolve. The housing 63 is provided with an intake chamber and port 66 and an exhaust port and chamber 67, the pipe 59 discharging into the port 66 and chamber in the housing 63 connected therewith; and the pipe 58 is connected into the chamber and port 67 to receive the discharge from the motor chamber opening into the exhaust chamber 67.

The compressor K is made similar to the motor O, and the pumps L and M are common ordinary gear pumps, all of which have their driving gear or rotor rigidly mounted on the shaft 60 so that as the motor O runs, the pumps and compressor will cause pressure and flow in the system in the direction indicated by the arrows in Figures 1, 3, 5, 6, 7, 8 and 9.

Attention is called to the fact, that as shown in Fig. 1, there is a packing 68 around the turbine shaft 17 and between the turbine and the worm 52a; and in Fig. 2 as shown at 69 there is a packing around the shaft 54 to stop any flow between the pump N and the housing of the drive therefor; and as shown in Fig. 5, at 70 there is a packing around the shaft 60 to stop any flow between the pump M and the motor O.

The turbine, pumps and motor shown in Figures 1, 2, 3, 5 and 6 are shown for illustration and it must be understood that other type of turbines or engines, pumps, motors and compressors may be employed so long as they are applicable to the refrigerating device and system shown in the drawings and described in this specification.

The absorption tank H comprises a closed tank having a series of baffle plates 71 therein that integrally join the wall of the tank, and at the central portion thereof is an upwardly extending tube-like element 72.

At 73 is shown inwardly and upwardly sloping flange-like elements that tightly fit against the wall of the tank H and which are permanently fixed in the position shown in the tank H by being spot welded or otherwise permanently attached to the wall of the tank H. The flange element 73 is provided with a hole 74 in the central portion thereof for purposes that will later be made obvious.

At Y is shown cap and flange elements comprising a cap portion 75 and an outwardly extending and upwardly sloping flange portion 76. The cap and flange elements Y are supported by spacer stud elements 77 positioned between the flange portions 76 and the flange elements 73 and being riveted to said elements so as to support the cap 75 in a position housing the tube 72 with the flange 76 extending outwardly and upwardly beneath the flange 73 so as to leave an open space between the cap 75 and the tube 72, and between the lower edge of the cap 75 and the plate 71, and between the outer edge of the flange 76 and the wall of the tank H and the flange elements 73.

At 78 is shown a plate concentrically positioned on top of each cap portion 75 and being permanently riveted thereto. The outer edge of the plates 78 are turned upwardly and are serrated or provided with vertical saw cuts 79 for purposes that will later be made obvious.

The absorption tank H is built up of a series of duplicate sections Z, each of which comprise an inverted cup shaped element X, the open end of the cup shaped section Z being slipped over the closed end of the adjacent section Z so that the end closure of the cup shaped elements Z forms the plate 71 above described. Each inverted cup shaped element X containing the cup, flanges and plate elements 75, 76, 73 and 78 and having the tubular element 72 integrally formed thereon.

The absorption tank H has a top closure section P, and a bottom closure section Q that join the sections Z in a manner similar to the sections Z joining each other, there being a chamber R formed in the upper closure element P; and in the lower closure element Q is formed a chamber S which is drained through the pipe 51.

In the chamber S is a horizontally disposed pipe 80 one end of which is provided with a vertically disposed reducer T-fitting 81 and having the large opening thereof directed upwardly and the small opening thereof directed upwardly as shown in Fig. 9. The other end of the pipe 80 is mounted in a fitting 83 carried on the inside face of the wall of the closure element Q and opening into the pipe 43 previously described.

At 49 is a pipe passing through the side wall of the upper closure element P and being in such a position as to discharge onto the flange element 73. Each section P, Z and Q contain one stage of the process of the refrigerant gas, trimethylamine, being absorbed in the absorbent, benzyl alcohol.

While the power end of this device is described as being a mercury vapor turbine, driving a pump which circulates a liquid (benzyl alcohol), which in turn drives a motor that drives a pair of pumps and a compressor for the circulation end of the refrigeration system.

The object of this arrangement is that should there be any leakage of mercury vapor from the turbine there would be no way for the mercury to find its way into the refrigeration circulatory system. A further object is that there may be instances where it would be desirable to position the mechanical power end of the device remote to the refrigeration end of the device. However, it must also be understood that, if desired, the pump N and the motor O may be dispensed with and the turbine B would drive the pumps L and M and the compressor K direct, in which case the drive shaft 60 in Fig. 5 would become the drive shaft 54 in Figures 1 and 2.

In Figures 1, 2, and 4 is shown an injector device for returning condensed mercury vapor from the exhaust of the turbine back to the mercury boiler system for further vaporization for the purpose of driving the turbine and heating the strong liquor of the refrigeration system as will later be described.

The mercury injector comprises a finned rotor U that is rigidly mounted on one end of a shaft V. On the other end of the shaft V is a gear W which is in mesh with the gear 55 that is on the shaft 54. The rotor U is revolvable in a housing 27 and is driven by the shaft V which is driven by the gears W and 55. The housing 27 is positioned over the mercury receiving chamber 29 and is provided on one side with an opening through which the pipe 26 discharges condensed mercury from the condenser chamber C' into the housing 27. In the other side of the housing 27 is a discharge opening 28 through which the mercury may discharge into the chamber 29. As the rotor U revolves the mercury will flow from the pipe 26 into the chamber in the housing 27 and between a pair of the fins U and as the rotor revolves the mercury will be moved over the opening 28 through which the mercury falls into the chamber 29 for the purpose previously described.

The operation of the device is as follows: The chemicals used herein, as before stated, are benzyl alcohol as the absorbent, and trimethylamine as the refrigerant, these chemicals having the characteristics of the trimethylamine being absorbed by the benzyl alcohol in the proportions hereinafter stated.

The mercury boiler is heated by a gas or other suitable flame in the space T in the cone shaped element 10 thereby creating a mercury vapor and pressure passes through the pipe 14x into the turbine and against the fins of the rotor 16 of the turbine B and finally discharges through the exhaust 21 to be discharged into the helical condenser channel 23 and against the generator pipe coil 33 therein and where the mercury vapor is condensed and flows, as liquid mercury, through the helical channel 23 to the condenser chamber C' from where the mercury flows thru the pipe 26 to an injector device shown in Figs. 1 and 4, and which discharges the mercury through the passage 28 into the receiving chamber 29 from where the mercury flows through the pipe 30 into the boiler space 12 to repeat the cycle just described. At 31 is a pipe connecting between the boiler space 14 and the top of the receiving chamber 29 so as to maintain an equal pressure in both the chamber 29 and boiler chamber 14 for the purpose of maintaining equal liquid levels in the boiler chamber 14 and receiving chamber 29 so as to not interfere with the entrance of mercury into the receiving chamber 29 that is being brought in by the injector device.

The turbine B being driven as above described, in turn drives the pump N which circulates a liquid, preferably benzyl alcohol, to drive the motor O, which in turn drives the pumps L and M and the compressor K for the purpose of circulating the refrigeration producing chemicals in the direction of the arrows shown in Figures 1, 2, 3, 7, 8 and 9 as will later be described.

In the lower portion S of the absorption tank H is a strong liquor which is composed of benzyl alcohol that has absorbed or is heavily ladened with trimethylamine. Thus the strong liquor is being pumped by the pump M from the absorption tank H through the pipes 51 and 31a through the outside portion of the counterflow heat exchanger X and pipe 33a to the reflected heat absorber 33c, and then through the pipe 33d into the generating coil 33 in the helical channel 23 where the mercury vapor at a temperature of about 454 degrees centigrade is being discharged from the exhaust of the turbine against the generator coil 33 in which is contained the strong liquor above described.

In as much as the benzyl alcohol boils at approximately +204 degrees centigrade and trimethylamine at +3½ degrees centigrade, ample heat is transferred to the benzyl alcohol (strong liquor), from the exhaust mercury vapor from the turbine to cycle the strong liquor in the absorption system, and at the same time the boiling point of the mercury being at a higher figure than strong liquor, the cool strong liquor furnishes the necessary cooling effect to condense the mercury in the condenser channel 23.

From the pipe coil 33 the strong liquor, now heated by the condensing mercury, rises under pressure of the heat and that set up by the pump M through the pipe 33b into the analyzer D where the trimethylamine refrigerant gas, due to the temperature thereof, separates from the benzyl alcohol and begins to cool. The refrigerant gas, trimethylamine, rises and travels upwardly through the analyzer in the direction of the arrows (see Fig. 8), to and through the pipe 41 (see Fig. 7), into and through the inner pipe of the counterflow heat exchanger X, and then through the pipe 41a into the condenser coil E where condensation of the refrigerant gas takes place; and simultaneously, the benzyl alcohol from which the trimethylamine has been liberated by the heat, is draining, or is being pumped by the pump L from the analyzer through the pipe 48 to and through the pump L and on through the pipe 49 to the absorption chamber H as will later be described.

The liquid refrigerant trimethylamine that is in the condenser coil E is now being forced through the pipe 42 to and through the expansion valve F where the liquid refrigerant is expanded to a gas and is discharged into the chilling coil G where refrigeration takes place, or in other words, the cold refrigerant gas is now absorbing heat in the chilling coil G that it lost in the condenser E and in the process of being expanded to a gas in the expansion valve F.

The refrigerant gas after passing through the chilling coil G is now transferred to the bottom of the absorption chamber H through the pipe 43 where the refrigerant gas is discharged through the pipe 80 (see Fig. 9), and T-fitting 81 against the bottom of the plate 78 into the chamber S of the absorption tank H from where the refrigerant gas passes upwardly through the absorption tank H to contact and be absorbed into the absorbent as will later be explained.

During the process just described, the pump L is pumping the weak liquor absorbent, benzyl alcohol, from the bottom of the analyzer D through the pipes 48 and 49 to the top of the absorption tank H where the absorbent is discharged into the top of the absorption tank H onto the flange element 73.

The liquid absorbent, benzyl alcohol, now fills the cups formed by the flange elements 73 and 76, and also fills the cups formed by the plate elements 71 and tubular elements 72 and the side walls of the sections Z, and the top of the tubular element 72 and overflows through the tube 72 into the trays 78 from where it overflows through the slots 79 and drips onto the next lower flange element 73 and fills the cup shaped formation thereof and so on through the several duplicate stages of the absorption chamber back to and through the reflected heat exchanger 44c where the strong liquor absorbs additional heat that is reflected from the boiler surface 10, and from the reflected heat absorber 33c the strong liquor travels through the pipe 33c to the generator coil 33 to repeat the cycle above described.

During the downward travel of the benzyl alcohol absorption tank H as above described, there is a simultaneous action of the refrigerant gas, trimethylamine, taking place as follows: As the benzyl alcohol flows downwardly through the several stages of the absorption tank as described, the trimethylamine that is being discharged from the T-fitting 81 strikes the bottom of the tray 78 thereabove and flows around the edges thereof and over the surface of the benzyl alcohol in the tray 78 where some absorption of the trimethylamine into the benzyl alcohol takes place. The remaining trimethylamine then flows upwardly through the tube 72 whereupon the trimethylamine contacts the benzyl alcohol in the chamber above the lower tray 78 and is forced downwardly around the outside of the tube 72 and bubbles through the benzyl alcohol under the flange element 76 and around the edge thereof, then upwardly under the flange element 73 and up through the hole or passage 74 and under the second tray 78 and over the surface of the benzyl alcohol held in the flange element 73 thereunder, and then around the edge and over the top of the second tray 78 to contact a surface of benzyl alcohol in the tray 78 and then pass on upwardly through the second tubular element 72, all this travel being indicated by the arrows in the drawings and represents the first stage of the process of the refrigerant, trimethylamine being absorbed by the absorbent, benzyl alcohol.

In Fig. 9 is shown an absorption tank providing for four duplicate stages of the absorption as above described. It will be understood that as the trimethylamine travels through the stages, its volume becomes less, due to the fact that it is being absorbed into the benzyl alcohol. Attention is called to the fact that the benzyl alcohol enters the top of the absorption tank at the point 50 as a weak liquor, that is, it contains little or no trimethylamine and as it travels downwardly through the several stages of the absorption above described, it finally arrives in the chamber S in the bottom of the absorption tank H as a strong liquor, that is, the benzyl alcohol is now saturated or nearly so, with the trimethylamine.

In bubbling the refrigerant, trimethylamine, upwardly through the absorbent, benzyl alcohol, in the absorption tank H as above described, it might be that some of the trimethylamine failed to absorb in the benzyl alcohol and, if so, it accumulated in the chamber R in the upper part of the absorption tank H as an unabsorbed gas that will have to be disposed of. The disposition is made as follows:

The compressor K forms a vacuum in the pipe line 45 and in the chamber R in the absorption tank H, and the unabsorbed refrigerant gas in the chamber R of the absorption tank H is drawn through the pipe 45 into the compressor K, where the gas is compressed, and due to the pressure, the gas will liquefy and at which time it will produce its latent heat and be pumped through the pipe 46 to the point 47 where it is discharged into the pipe 41 and the contents of the pipes 41 and 46 pass through the counter-flow heat exchanger X where the contents of the pipe 41 gives off its heat which is absorbed by the contents of the outside portion of the heat exchanger X and then flows on through the pipe 41a into the condenser E for the final condensation and then to the expansion valve F and the chilling coil G to repeat the cycle of refrigeration above described.

Owing to the fact that variable pressure will be required in the condenser E to cause condensation at variable temperatures of the space in which the condenser may be placed, and to further the economical operation of the machine, the two thermostatically operated valves 85 and 87 are placed in the fuel line 84—88 of the burner 13 and functions as follows:

The throttling valve 85 will vary the fuel input to the burner 13 so as to produce the pressure required in the condenser E to produce condensation of the refrigerant gas therein.

The thermostatically operated snap open and shut valve 87 controls the fuel being fed to the burner 13 and accordingly functions to start and stop the machine in accordance with the need for refrigeration.

In summary, then, of the general characteristics of the above machine compared to existing types, the following stand out as the most important:

Engine

1. Adapted to automatic operation from a thermostat. A mercury vapor turbine, easy starting, no valves or adjustments.

*Note.*—Any engine with exhaust gas heater attachment may be used on the larger sizes where automatic operation is not required.

2. Concentrates its waste heat to be used in heating the absorbent, benzyl alcohol. The temperature of the mercury vapor entering the liquid cooled condenser is well above that required to heat the absorbent.

3. Made with hydraulic drive—to prevent the mercury from entering the refrigeration cycle and enabling the entire system to be brazed shut, preventing leakage.

System

A system presenting the characteristics of both the compression and absorption types of refrigeration, and maintaining the separate component functions in a definite and exact relationship, so as to produce a "forced" freezing cycle giving definite and unvarying results.

A system especially designed to take full advantage of the outstanding characteristics of the chemicals used, among which are—

A refrigerating gas of high latent heat—5820 cal./mole Trouton's constant 21.1. Thompson, H. W., Linnett, J. W., Trans. Faraday, sec. 32, 681–5 (1936) making profitable an exchange of heat between the condensing refrigerant gas and the saturated absorbent.

A high absorption ratio where 1198 is volume of gas (reduced to zero Cent. and 760 mm.) dissolved in one volume of solvent at 25 deg. Cent. when the partial pressure of the gas equals 760 mm. Ibid., III, 369.

Pumps

Alcohol circulation pumps of the gear force type, directly connected together, one acting as a force pump to transfer saturated alcohol from the absorption chamber, operating under vacuum to the compression side of the system, and the other acting as a flow meter limiting the flow of the weak alcohol from the analyzer to the absorption chamber and maintaining an exact volume of flow ratio between them, corresponding to the difference in volume between the weak and saturated alcohol. This maintains a uniform vacuum in the absorption chamber and increases efficiency.

The compressor suction line is connected to the top of the absorbent chamber—reinforcing the vacuum and drawing its charge of refrigerant gas from the expansion coil into the bottom of the absorption chamber and up through its various baffle stages and maintaining a high turbulence in the entire chamber thus greatly increasing the efficiency over the common "gravity" types in which the volume of gas entering the chamber and contacting the alcohol is limited by the amount of absorption.

Absorption chamber

Forced circulation type absorption chamber in which the full effect of the forced circulation of both the absorbent and the gas is utilized.

Made in sections—maintaining maximum contact between them, and so that any degree of saturation may be obtained by adding sufficient stages.

Control

Double thermostatic control. Controlling the volume of flow according to the need of condensing pressure and controlling its duration according to the need for refrigeration.

Having described my invention, what I claim is:

1. In a combined compression and absorption refrigeration system embodying a plurality of circuits, a generator, an analyzer, a heat exchanger, a condenser, a chilling coil, an absorber and a plurality of pumps, arranged in the circuits, one of said circuits comprising a conduit connecting said generator with the analyzer, a conduit connecting the analyzer with the heat exchanger, a conduit connecting the heat exchanger with the condenser and chilling coil, and a conduit connecting the chilling coil with the absorber, a conduit connecting the absorber with the heat exchanger, a pump positioned in said conduit, a conduit connecting the heat exchanger with the generator, and means for conducting refrigerating gas from the absorber to said condenser under pressure.

2. A combined compression and absorption refrigerating system comprising a generator, an analyzer, a heat exchanger, a condenser and chilling coil, an absorber and a plurality of pumps, a plurality of conduits connecting the several elements in a manner to establish a plurality of circuits, one of said circuits extending from the generator to the analyzer, from the analyzer to the heat exchanger, from the heat exchanger to the condenser, thence to the chilling coil, from the chilling coil to the lower end of the absorber, from the absorber to the heat exchanger and back to the generator, a pump positioned in the conduit from the absorber to the heat exchanger, a second circuit embodying a conduit from the analyzer to the absorber, flow control means arranged therein, and a conduit from the absorber to the heat exchanger with a compressor therein, and means operable from the generator for driving the pump and compressor.

3. In a refrigerating system of the character described embodying both compression and absorption, comprising a generator, an analyzer, a condenser, a chilling coil and an absorber, conduits connecting the several elements in such way that two independent circuits are provided, one circuit for conducting a volatilized refrigerant from the generator to the analyzer, a take-off conduit for gaseous refrigerant from the analyzer to the condenser and the chilling coil, a conduit for conducting the refrigerant from the chilling coil to the absorber, and a conduit for rich liquor from the absorber to the generator, a pump positioned in the last-named conduit, a conduit for weak liquor extending from the analyzer to the absorber, a pump positioned therein, a conduit extending from the absorber to the condenser for unabsorbed refrigerant gas, a compressor positioned in said conduit, heating means for rich liquor passing through the generator, and means operable by the heating means for driving the said pumps and compressor.

4. A refrigerating system of the character described employing both compression and absorption, comprising a mercury vapor generator for volatilizing a rich refrigerant liquor, an analyzer, a conduit leading from the generator to the analyzer adjacent its lower end, a discharge conduit leading from the upper end of the analyzer to a heat exchanger and thence to a condenser for conducting vaporized refrigerant to said coil, a chilling coil for receiving the expanded refrigerant, an expansion valve between the condenser and the chilling coil, an absorber, a conduit from the chilling coil to the lower end of the absorber, a conduit from the lower end of the analyzer to the upper end of the absorber for weak liquor, a pump positioned in the last-named conduit, a conduit leading from the upper end of the absorber for unabsorbed refrigerant gas to a point adjacent the entrance end of the condenser, a compressor positioned in said conduit, a conduit for rich liquor leading from the lower end of the absorber to said generator, a pump arranged in said conduit and power means operable by said mercury vapor generator for providing motive driving force to said pumps and compressor.

5. A combined refrigerating system of the compression and absorption type comprising a mercury vapor generator, an analyzer, a condenser and chilling coil, an absorber and a plurality of pumps and a compressor, conduits connecting the several elements for providing a plurality of circuits, said mercury vapor generator including a coil for the passage of a rich liquor to be volatilized, turbine means carried by the generator and operable by the mercury vapor, means whereby the exhaust mercury vapor is caused to impinge upon the said coil, a source of heat for the generator, temperature control means for the source of heat, and means operable by the turbine means for imparting driving movement to the said pumps and compressor.

6. A refrigerating system of the character described employing both compression and absorption, comprising a mercury vapor generator, an analyzer, a condenser, a chilling coil, and an absorber, a plurality of conduits connecting the several elements in such manner that two independent circuits are provided, pumps arranged in certain of the conduits, a compressor, said generator comprising a mercury boiler, heating means for vaporizing the mercury, a coil arranged adjacent said boiler for conducting a refrigerant thereover, a turbine carried by the generator and adapted to be driven by the mercury vapor, means for conducting the exhaust from said turbine over the said coil, means driven by the turbine for imparting a positive drive to the pumps and the compressor, and temperature actuated means for controlling the heating means.

7. In a combined compression and absorption refrigerating system, the combination with a generator, an analyzer, a condenser, a chilling coil and an absorber, of conduits connecting the several elements in such manner that two independent circuits are established, a plurality of pumps and a compressor, said analyzer comprising a cylindrical shell, baffles arranged in said shell in such manner that a refrigerant passing therethrough must partake of a tortuous course, a conduit leading into the lower end of the shell for conducting a volatilized refrigerant thereto from the generator, a conduit leading from the upper end of the shell to a condenser for the conduct of a refrigerant gas, a conduit leading from the lower end of the shell to the absorber for conducting weak liquor, means arranged in said conduit for controlling the flow therein, a conduit leading from the chilling coil to the absorber, a conduit leading from the absorber to the condenser, and a conduit leading from the absorber to the generator, pumps and a compressor arranged in certain of the conduits, and means operable from the generator for driving the pumps and the compressor.

8. A system of the character described comprising a generator, an analyzer, a condenser, a chilling coil, an absorber and a plurality of conduits connecting the several elements for establishing two circuits, said absorber comprising a cylindrical shell, a plurality of baffle plates arranged therein for providing a tortuous passage from top to bottom of the shell, a conduit leading into the upper end of the shell from said analyzer for conducting weak liquor thereto, a conduit leading into the lower end of the shell from the chilling coil for conducting refrigerant gas thereto, said liquor and said gas passing through the shell in a tortuous manner and in opposed relation, a conduit leading from the lower end of the shell to the generator for conducting rich liquor therefrom, pump means arranged in said last-named conduit for regulating the flow of rich liquor in proportion to the combined input of the weak liquor conduit and the gas conduit, a conduit leading from the top of said shell to said condenser for conducting unabsorbed gas from the absorber, and a compressor arranged in said last-named conduit.

9. A system of the character described comprising a generator, an analyzer, a condenser, a chilling coil, an absorber, and a plurality of conduits connecting the several elements for establishing two circuits, said absorber comprising a cylindrical shell, a plurality of baffle plates arranged therein for providing a tortuous passage from top to bottom of the shell, a conduit leading into the upper end of the shell from said analyzer for conducting weak liquor thereto, a conduit leading into the lower end of the shell from the chilling coil for conducting refrigerant gas thereto, said liquor and said gas passing through the shell in a tortuous manner and in opposed relation, a conduit leading from the lower end of the shell to the generator for conducting rich liquor therefrom, pump means arranged in said last-named conduit for regulating the flow of rich liquor in proportion to the combined input of the weak liquor conduit and the gas conduit, a conduit leading from the top of said shell to said condenser for conducting unabsorbed gas from the absorber, and a compressor arranged in said last-named conduit, said compressor serving to create a vacuum in the shell, the chilling coil and the weak liquor input line from the analyzer, and means located in the said weak liquor line for regulating the flow therethrough.

10. A combined compression and absorption refrigeration system embodying a generator, an analyzer, a condenser, a chilling coil and an absorber, conduits connecting the several elements in such manner that two independent circuits are established, the said condenser, chilling coil and absorber so interconnected as to be common to both circuits, and a compressor and pumps for controlling the flow of the refrigerant throughout the two circuits.

RALPH S. CLAYTON.